(No Model.)
J. R. DAVIES.
CAR WHEEL.
No. 469,681. Patented Mar. 1, 1892.
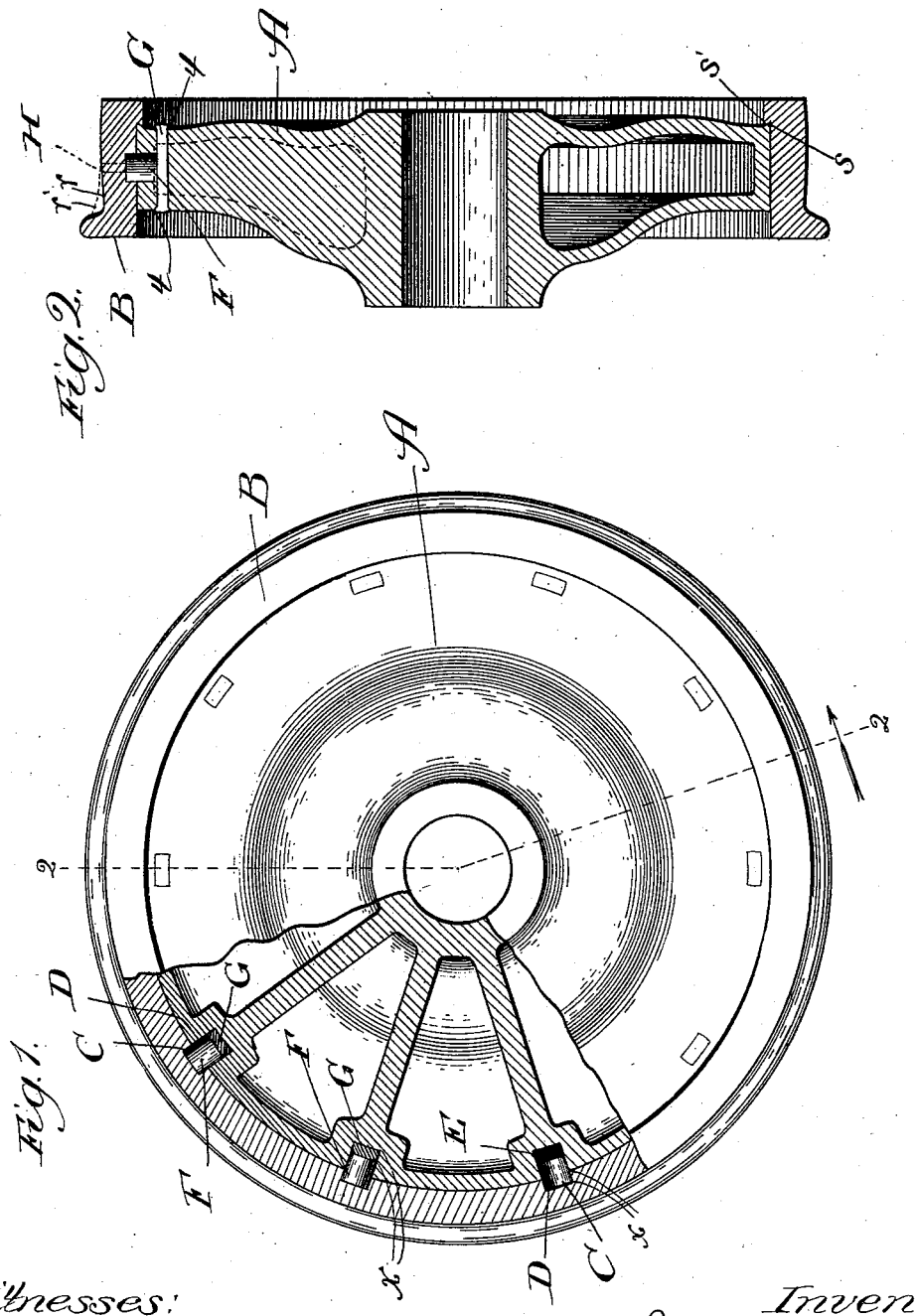

United States Patent Office.

JOHN R. DAVIES, OF WOODLAWN PARK, ILLINOIS.

CAR-WHEEL.

SPECIFICATION forming part of Letters Patent No. 469,681, dated March 1, 1892.

Application filed October 20, 1891. Serial No. 409,258. (No model.)

*To all whom it may concern:*

Be it known that I, JOHN R. DAVIES, a citizen of the United States, residing at Woodlawn Park, in the county of Cook and State of Illinois, have invented a new and useful Improvement in Car-Wheels, of which the following is a specification.

My invention relates to an improvement in car-wheels of the kind in which the tire is separate from and usually shrunk upon the center, which latter may be of metal or of any other material suitable for the purpose; and the object of my invention is to provide in such a car-wheel a means for securing the flange portion from displacement without the employment of bolts or side plates or retaining-rings. Heretofore it has been the practice to provide a connection at the side or center of the wheel, and usually in the form of a plate bolted or otherwise firmly secured to the flange and caused to be retained in place by bolts passing through the center from side to side. Aside from the fact that this construction involves much labor, which it is desirable to avoid, it is found that the bolts are more or less liable to become loosened, and the good effect from their use is thus destroyed. There are other objections recognized by railway-men, all of which it is my object to overcome.

To this end my invention consists in a car-wheel in which the tire portion is held against displacement by a dowel connection with the center, the dowels entering contiguous recesses formed in the outer periphery of the center and the inner periphery of the tire.

By the term "dowel," as herein employed, is to be understood a pin or plug to slide in and out or rest in a recess having substantially smooth sides prepared therefor and is to be understood as distinguished from a screw or the like, the purpose of which is to hold two parts together by the engagement of screw-threads on the entering device with screw-threads on the interior of the recess.

My invention consists, further, in a convenient means for holding the dowel in place after it has been caused to enter the contiguous recesses mentioned, the means provided being of a character also to permit the ready removal of the dowel when desired; and incidental to this feature my invention consists in an improved method by which the dowel may be removed and the tire, which has become worn in use and requires replacing, may be removed from the center.

In the drawings, Figure 1 is a side elevation of the upper half of a car-wheel, showing in broken section the application of my improvement; and Fig. 2 is a transverse section taken at the periphery of the center and showing details of construction.

A represents the car-wheel center, and B the tire or tread portion. It is usual to apply the tire B to the center A by expanding the former under heat, and while thus in its expanded condition to place it upon the center and allow the same to shrink, thus becoming firmly secured in position. Shrinking alone is not sufficient, however, always to hold the tire in place, and hence the practice before noted of bolting the parts together, and which by my invention is rendered necessary. At points on the inner periphery of the tire, ordinarily in number equal to the number of spokes in the wheel, are provided dowel-recesses C, which may be circular or angular in form. In the center at points which, when the tire and center are applied together, will be opposite the points at which the recesses C are provided in the tire are formed recesses D, preferably somewhat deeper than the recesses C and having otherwise dimensions similar to those of the recesses C. Transversely of the center and immediately back of the recesses D apertures E are formed to produce, with the recesses D, inverted-T-shaped apertures, it being understood that the recess D opens into the aperture E. The width of the aperture E is about equal to the depth of the recesses C. A dowel F, having a configuration to fit snugly in the recesses C and D, is introduced into each recess D to be flush with the outer surface of the center, being caused thereby to extend into and against the inner wall of the aperture E. The tire B having been heated and applied to the center, it is turned until the recesses D and C are opposite each other, whereupon it is allowed to shrink into place, and a tool is then introduced into the aperture E behind the dowel F and the latter forced outward until it enters the recess C. A key G is thereupon introduced into the aperture E, filling the latter, and being headed at each end, as indicated at $t$, serves to prevent the dowel from displacement and firmly to retain the tire against movement upon the center. In order to assist the operation of centering the tire with relation to the center, it is desirable to form on the tire a shoulder $s$, beveled, as indicated, to receive the annular bevel $s'$ on the center; but this is not essential. The tire and center being secured together by the mechanism described, it is quite apparent that they cannot be separated even when the key G is withdrawn.

While the tire is in condition for use, no necessity for the withdrawal of the dowels will occur; but when it is desired to replace the tire the withdrawing operation may be accomplished in the following way: A hole H is bored through the tire to the inner end of the recess C, the hole extending from the worn face $r$ of the tire. The hole H being formed and the key G withdrawn, the dowel may be forced out of the recess C by a tool introduced through the hole H, and the same operation being performed at each dowel the removal of the tire may be readily accomplished.

While the method of removing the dowels and the method of introducing them herein described is believed to be in many respects the most desirable, it is quite clear that the invention is not limited thereto, any structure which, while affording a dowel connection between the tire and center prevents the withdrawal of a dowel and is constituted substantially like the structure herein shown, being included therein.

What I claim as new, and desire to secure by Letters Patent, is—

1. In combination with the center and tire of a car-wheel, a dowel connection between said parts and means for retaining the dowel in place, substantially as described.

2. The combination, with the center having peripheral dowel-recesses and a tire having dowel-recesses, of dowels introduced into said recesses and keys for holding the dowels in place, substantially as described.

3. The combination, with a center having peripheral dowel-recesses and transverse key-apertures behind the same and with a tire having corresponding dowel-recesses, of dowels F, introduced into the dowel-recesses, and keys G, introduced into the key-apertures and held in place, substantially as described.

4. The method of withdrawing the dowels which hold the tire and center of a car-wheel from relative displacement, which consists in providing a hole in the tire opposite each dowel-recess and expelling the dowel from its recess by pressure exerted through said hole, substantially as described.

5. The combination, with a tire B, having shoulders $s$ and dowel-recesses C, and with a center having dowel-recesses D and transverse key-apertures E and having a shoulder $s'$, of a dowel F in the dowel-recesses and a key G in the key-apertures, secured in place substantially as described.

JOHN R. DAVIES.

In presence of—
A. DYRENFORTH,
J. N. HANSON.